（12）United States Patent
Shitaoka et al.

(10) Patent No.: US 12,013,467 B2
(45) Date of Patent: Jun. 18, 2024

(54) POSITIONING DEVICE, SPEED MEASURING DEVICE, AND COMPUTER PROGRAM PRODUCT

(71) Applicant: DENSO CORPORATION, Kariya (JP)

(72) Inventors: Kazuya Shitaoka, Nagakute (JP); Noriyoshi Suzuki, Nagakute (JP); Akira Miyajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 498 days.

(21) Appl. No.: 17/328,474

(22) Filed: May 24, 2021

(65) Prior Publication Data

US 2021/0286084 A1 Sep. 16, 2021

Related U.S. Application Data

(63) Continuation of application No. PCT/JP2019/045962, filed on Nov. 25, 2019.

(30) Foreign Application Priority Data

Nov. 26, 2018 (JP) .................. 2018-220142

(51) Int. Cl.
*G01S 19/03* (2010.01)
*G01S 5/02* (2010.01)
(Continued)

(52) U.S. Cl.
CPC ............ *G01S 19/03* (2013.01); *G01S 5/0284* (2013.01); *G01S 19/23* (2013.01); *G01S 19/31* (2013.01); *G01S 19/53* (2013.01)

(58) Field of Classification Search
None
See application file for complete search history.

(56) References Cited

U.S. PATENT DOCUMENTS 4,725,843 A * 2/1988 Suzuki .................. H01Q 1/3275
342/359
5,144,318 A 9/1992 Kishi
(Continued)

FOREIGN PATENT DOCUMENTS

CN 104345326 A * 2/2015 ........... G01S 19/396
JP H02196975 A 8/1990
(Continued)

OTHER PUBLICATIONS

Y. Kojima, "Proposal for a new localization method using tightly coupled integration based on a precise estimation of trajectory from GPS Doppler", Proceedings of AVEC2010, Laughborough UK, 2010.

*Primary Examiner* — Adolf Dsouza
(74) *Attorney, Agent, or Firm* — Harness, Dickey & Pierce, P.L.C.

(57) ABSTRACT

A positioning device or a speed measuring device includes: a satellite information acquisition portion that acquires satellite information including information related to a position of multiple satellites and information related to a distance between each of the multiple satellites and a mobile body or a relative speed with the multiple satellites; an attitude detection portion that detects an attitude of the mobile body; a relationship calculation portion that calculates a positional relationship or a speed relationship between an installation location of each of the multiple satellite antennas on the earth and a positioning target location; and a calculation portion that calculates a position of the positioning target location on the earth or a speed at the positioning target location.

8 Claims, 11 Drawing Sheets

(51) Int. Cl.
   *G01S 19/23*   (2010.01)
   *G01S 19/31*   (2010.01)
   *G01S 19/53*   (2010.01)

(56) References Cited

U.S. PATENT DOCUMENTS

| | | | | |
|---|---|---|---|---|
| 5,173,708 | A | * 12/1992 | Suzuki | H01Q 1/1257 |
| | | | | 342/359 |
| 2009/0115659 | A1 | * 5/2009 | Watanabe | G01S 19/33 |
| | | | | 342/357.73 |
| 2015/0032304 | A1 | * 1/2015 | Nakamura | G01S 3/143 |
| | | | | 342/442 |

FOREIGN PATENT DOCUMENTS

| | | | |
|---|---|---|---|
| JP | 2009145283 | A | 7/2009 |
| JP | 3178938 | U | 10/2012 |
| JP | 2015025671 | A | 2/2015 |

\* cited by examiner

VIEW SEEN FROM DIRECTLY ABOVE WITH RESPECT TO ROAD SURFACE

VIEW SEEN FROM JUST SIDE WITH RESPECT TO ROAD SURFACE

VIEW SEEN FROM DIRECTLY ABOVE WITH RESPECT TO ROAD SURFACE

VIEW SEEN FROM JUST SIDE WITH RESPECT TO ROAD SURFACE

VIEW OBTAINED BY PROJECTION ONTO GROUND SURFACE (EN COORDINATE PLANE)

VIEW SEEN FROM DIRECTLY ABOVE WITH RESPECT TO ROAD SURFACE

VIEW SEEN FROM JUST SIDE WITH RESPECT TO ROAD SURFACE

VIEW SEEN FROM DIRECTLY ABOVE WITH RESPECT TO ROAD SURFACE

VIEW SEEN FROM JUST SIDE WITH RESPECT TO ROAD SURFACE

VIEW OBTAINED BY PROJECTION ONTO GROUND SURFACE (EN COORDINATE PLANE)

POSITIONING DEVICE, SPEED MEASURING DEVICE, AND COMPUTER PROGRAM PRODUCT

CROSS REFERENCE TO RELATED APPLICATIONS

The present application is a continuation application of International Patent Application No. PCT/JP2019/045962 filed on Nov. 25, 2019, which designated the U.S. and claims the benefit of priority from Japanese Patent Application No. 2018-220142 filed on Nov. 26, 2018. The entire disclosures of all of the above applications are incorporated herein by reference.

TECHNICAL FIELD

The present disclosure relates to a positioning device, a speed measuring device, and a program, and, more particularly, relates to a positioning device, a speed measuring device, and a program that measure a position of a mobile body based on satellite information or measure a speed.

BACKGROUND

A positioning device that calculates a position of a flying object by installing multiple GPS antennas on the outer periphery of the flying object has been known (Patent Literature 1: JP 2009-145283 A).

SUMMARY

A positioning device or a speed measuring device may include: a satellite information acquisition portion that may acquire satellite information including information related to a position of multiple satellites and information related to a distance between each of the multiple satellites and a mobile body or a relative speed with the multiple satellites; an attitude detection portion that may detect an attitude of the mobile body; a relationship calculation portion that may calculate a positional relationship or a speed relationship between an installation location of each of the multiple satellite antennas on the earth and a positioning target location; and a calculation portion that may calculate a position of the positioning target location on the earth or a speed at the positioning target location.

DETAILED DESCRIPTION

Figure 1:
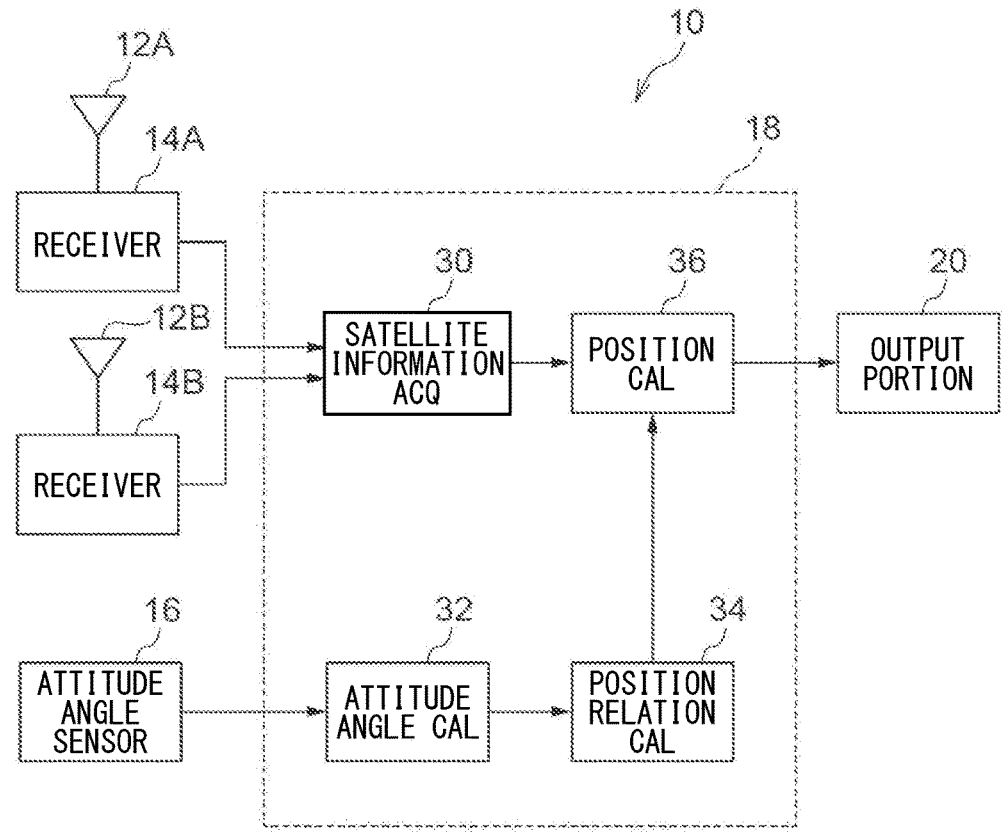
FIG. 1 is a block diagram showing a positioning device according to a first embodiment.

In this positioning device of Patent Literature 1, each GPS antenna is connected to an independent GPS receiver. Here, a specific position (for example, a center position) of the flying object can be represented by approximation using an average position of each antenna. Thereby, unknowns are the average position (x, y, z) of each antenna, clock errors of n installed GPS receivers, and the total number expressed as 3+n. When the satellites, of which number is 3+n or more, can be measured and a pseudo distance can be acquired, the positioning result can be obtained by the least squares method.

In addition, a vehicle GPS navigation device that calculates a vehicle position by using multiple GPS antenna placed at the left, right, front, back, or the like other than a rooftop of a vehicle has been known (Patent Literature 2: JP H2-196975 A). This vehicle GPS navigation device selects a satellite that can be received by each antenna, based on satellite orbital data, antenna installation positions, and a traveling direction of a vehicle detected by a direction sensor. Thereby, a calculation time for determining a satellite having a high reception sensitivity based on an actual reception result is unnecessary, and the reception satellite is determined in advance. Therefore, positioning calculation can be performed reliably and quickly. Regarding the positioning calculation, it is only described that "a navigation equation is solved by using the satellite position and a pseudo distance observation result, and thereby a subject vehicle position is calculated". However, a positional relationship between the subject vehicle position (positioning target location) and each antenna installation location is not considered.

Further, a method of calculating a vehicle speed based on a relative speed with a satellite has been known, the relative speed being obtained based on an observed doppler frequency (Non-Patent Literature 1: Y. Kojima, "Proposal for a new localization method using tightly coupled integration based on a precise estimation of trajectory from GPS Doppler", Proceedings of AVEC2010, Laughborough UK, 2010). In Non-Patent Literature 1, although it is assumed that the number of GNSS antennas installed on a vehicle is "one", a case where multiple antennas are installed is not considered.

Due to reasons related to vehicle design, the GNSS antenna is not installed as shown in the conventional configuration. Even when the GNSS antenna is installed in a vehicle interior or the like, the positioning accuracy equal to the conventional case is required. In the vehicle interior, satellite signals are shielded by roofs and pillars. Therefore, it is clear that the number of visible satellites decreases as compared with a case where the roof is installed. As one solution to this, it is considered that, in the vehicle complement, multiple GNSS antennas are installed so as to complement each of shielding areas. There are several possible device configurations when installing multiple GNSS antennas. For providing a device configuration having an inexpensive and high installation freedom, it is considered that the "pair of each GNSS antenna and receiver" is provided as a completely independent device configuration.

In the case of the device configuration of Patent Literature 1, a positioning method using multiple GPS antennas has been proposed. However, it is assumed that the positioning target location (in the example described above, the center position of the device) can be approximated by the average position of each antenna. That is it is assumed that "the positioning target location is approximately at the center of gravity of all antenna installation locations". Accordingly, when the assumption is not established, for example, when a positioning target location is set to a center of vehicle headlights (tip in front of the vehicle) of a target subject vehicle and one antenna is installed in a front part in a vehicle interior and another antenna is installed in a back part in the vehicle interior, in the technology of Patent Literature 1 described above, the inventors found that the actually calculated position has an error of about 2 meters since a position around the center of the vehicle interior is calculated.

Also in Patent Literature 2 described above, similarly, a positioning method using multiple GPS antennas has been proposed in the case of the device described above.

However, in the technology described in Patent Literature 2 described above, a positional relationship between the positioning target location and each antenna installation location is not considered, and positioning calculation is performed on the assumption that "the pseudo distance observed at each antenna installation location is observed at the positioning target location".

Accordingly, the inventors found that the positioning error becomes larger as a distance between the positioning target location and the antenna installation location becomes larger.

Non-Patent Literature 1 is different from Patent Literature 1 and Patent Literature 2, and proposes an estimation algorithm of a "vehicle speed" based on a relative speed with the satellite obtained using the doppler frequency observed by the GNSS receiver. However, in the technology described in Non-Patent Literature 1 described above, although it is assumed that the number of installed antennas is one, it is not considered that multiple antennas are installed.

Here, in a case where multiple antennas are installed and antenna installation locations are different from a positioning target location, a speed vector at each of locations is different depending on an angular speed and a distance between those locations when the vehicle travels through a curve.

Accordingly, when the vehicle speed is estimated using multiple antennas, simply, the conventional technology is applied. That is, the vehicle speed is calculated on the assumption that "the relative speed, obtained based on the doppler frequency observed at each antenna installation location, with the satellite is a speed observed at the positioning target location". Then, since the difference in the vector speed described above is not considered, the error in the speed calculation becomes large when the distance between the positioning target location and the antenna installation location is large, when a vehicle frequently passes through the curve, and the like.

One example of the present disclosure provides a positioning device and a program capable of accurately calculating a position, on the earth, of a positioning target location different from installation locations of multiple satellite antennas in a mobile body.

Another example of the present disclosure provides a speed measuring device and a computer program product capable of accurately calculating a speed, on the earth, at a positioning target location different from installation locations of multiple satellite antennas of a mobile body.

According to a first example embodiment, a positioning device calculates a position, on an earth, of a positioning target location different from an installation location of each of multiple satellite antennas in a mobile body. The positioning device includes: a satellite information acquisition portion that acquires satellite information including information that is related to a position of each of multiple satellites and transmitted from the multiple satellites and information that is related to a distance between each of the multiple satellites and the mobile body; an attitude detection portion that detects an attitude of the mobile body; a positional relationship calculation portion that calculates a positional relationship between the installation location of each of the multiple satellite antennas on the earth and the positioning target location for each of the multiple satellite antennas, based on a detected attitude of the mobile body; and a position calculation portion that calculates the position of the positioning target location on the earth based on a calculated positional relationship and acquired satellite information.

According to a second example embodiment, a computer program product is used for calculating a position, on an earth, of a positioning target location different from an installation location of each of multiple satellite antennas in a mobile body, is stored on a non-transitory computer readable medium, and comprises instructions configured to, when executed by a computer, cause the computer to: acquire satellite information including information that is related to a position of each of multiple satellites and transmitted from the multiple satellites and information that is related to a distance between each of the multiple satellites and the mobile body; detect an attitude of the mobile body; calculate a positional relationship between the installation location of each of the multiple satellite antennas on the earth and the positioning target location for each of the multiple satellite antennas, based on a detected attitude of the mobile body; and calculate a position of the positioning target location on the earth based on a calculated positional relationship and acquired satellite information.

According to the first example embodiment and the second example embodiment, based on the detected attitude of the mobile body, the positional relationship between the installation location of the satellite antenna and the positioning target location is calculated for each of the multiple satellite antennas. The position of the positioning target location on the earth is calculated based on a calculated positional relationship and acquired satellite information. Thereby, it may be possible to accurately calculate the position, on the earth, of the positioning target location different from the installation locations of the multiple satellite antennas in the mobile body.

According to a third example embodiment, a speed measuring device calculates a speed, on an earth, at a positioning target location different from an installation location of each of multiple satellite antennas in a mobile body. The speed measuring device includes: a satellite information acquisition portion that acquires satellite information including information that is related to a position of each of multiple satellites and transmitted from the multiple satellites and information that is related to a relative speed of the mobile body with respect to each of the multiple satellites; an attitude detection portion that detects an attitude of the mobile body; an angular speed detection portion that detects an angular speed of the mobile body; a positional relationship calculation portion that calculates a speed relationship between the installation location of each of the multiple satellite antennas on the earth and the positioning target location for each of the multiple satellite antennas, based on a detected attitude of the mobile body and a detected angular speed of the mobile body; a speed calculation portion that calculates the speed at the positioning target location on the earth based on a calculated speed relationship and acquired satellite information.

According to a fourth example embodiment, a computer program product is used for calculating a speed, on an earth, at a positioning target location different from an installation location of each of multiple satellite antennas in a mobile body, is stored on a non-transitory computer readable medium, and comprises instructions configured to, when executed by a computer, cause the computer to: acquire satellite information including information that is related to a position of each of multiple satellites and transmitted from the multiple satellites and information that is related to a relative speed of the mobile body with respect to each of the multiple satellites; detect an attitude of the mobile body; detect an angular speed of the mobile body; calculate a speed relationship between the installation location of each of the multiple satellite antennas on the earth and the positioning target location for each of the multiple satellite antennas, based on a detected attitude of the mobile body and a detected angular speed of the mobile body; calculate the speed at the positioning target location on the earth based on a calculated speed relationship and acquired satellite information.

According to the third example embodiment and the fourth example embodiment, based on the detected attitude of the mobile body and the detected angular speed of the mobile body, the speed relationship between the installation location of the satellite antenna and the positioning target location is calculated for each of the multiple satellite antennas. The speed at the positioning target location on the earth is calculated based on a calculated speed relationship and acquired satellite information. Thereby, it may be possible to accurately calculate the speed, on the earth, at the positioning target location different from the installation locations of the multiple satellite antennas in the mobile body.

The storage medium storing the program according to one example embodiment of the present disclosure is not particularly limited, and may be a hard disk or a ROM. The storage medium may be a CD-ROM, a DVD disc, a magneto-optical disc, or a C card. Further, the program may be downloaded from a server connected to a network or the like.

Patent Literature 1, Patent Literature 2, and Non-Patent Literature 1 are incorporated herein by reference.

Hereinafter, embodiments of the present disclosure will be described with reference to the drawings. In the present embodiment, a case where the present disclosure is applied to an example in which a positioning device that is installed on a vehicle, acquires GPS information transmitted from the GPS satellites, and performs positioning will be described.

Overview of Embodiments of Present Disclosure

When positioning is performed using multiple GNSS antennas, a positioning target location and a GNSS antenna installation location where an observation value is obtained do not coincide with each other.

In embodiments of the present disclosure, a positional relationship and a speed relationship between the positioning target location and each GNSS antenna installation location are appropriately considered. Therefore, even when the observation value obtained at a location different from the positioning target location is used, it may be possible to calculate a position of the positioning target location and a speed with high accuracy.

First Embodiment

As shown in FIG. 1, a positioning device 10 according to a first embodiment includes GPS antennas 12A and 12B for receiving electric waves from a GPS satellite, and receivers 14A and 14B that acquire reception signals from the satellite by using the GPS antennas 12A and 12B. The GPS antennas 12A and 12B may correspond to satellite antennas. The positioning device 10 includes an attitude angle sensor 16, a computer 18 that executes a positioning process of estimating a subject vehicle position based on the reception signals received by the receivers 14A and 14B from the GPS satellite and a detection value of the attitude angle sensor 16, and an output portion 20.

Figure 2:
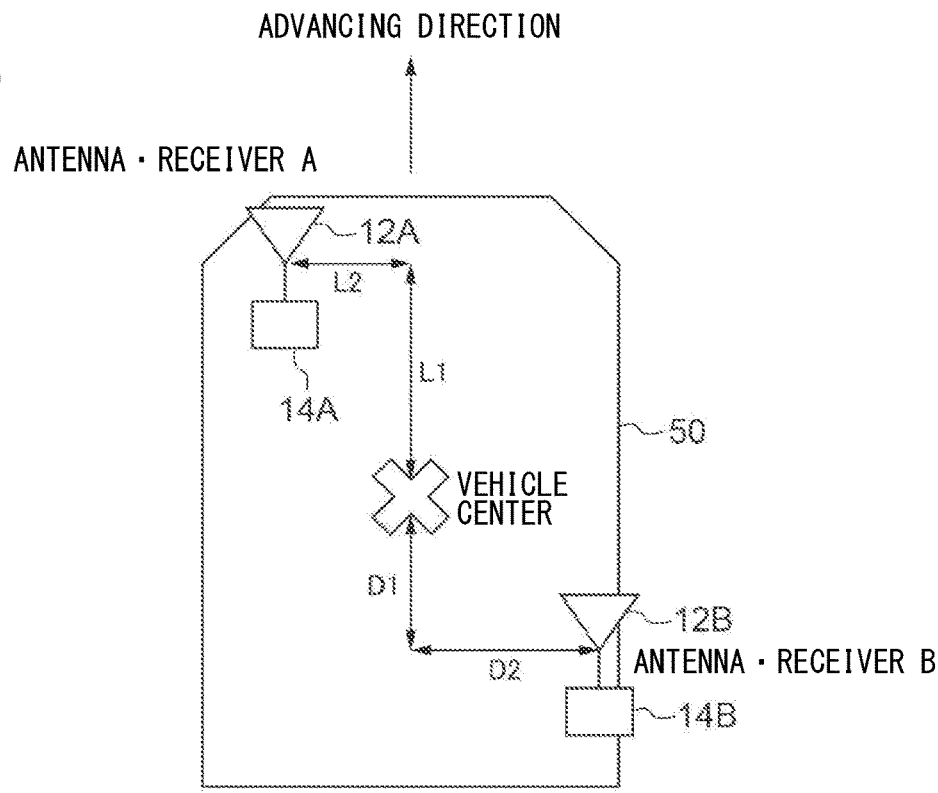
FIG. 2 is a view showing an example in which a positioning target location is set to a vehicle center and two GPS antennas are installed.

The GPS antennas 12A and 12B are installed, for example, in a vehicle interior of a subject vehicle 50, and are installed at locations different from the positioning target location (see FIG. 2). In the present embodiment, it is considered that the positioning target location is set to the vehicle center, and the GPS antennas 12A and 12B and the receivers 14A and 14B are installed at positions shown in FIG. 1. Here, it is assumed that a distance between each of the GPS antennas 12A and 12B and the positioning target location (vehicle center) can be accurately grasped by manually measuring them.

The receiver 14A is installed for the GPS antenna 12A, and the receiver 14B is installed for the GPS 12B. The receivers 14A and 14B receive electric waves from multiple GPS satellites via the GPS antennas 12A and 12B, and acquire, as GPS satellite information, satellite numbers of the GPS satellites, orbital information of the GPS satellites (ephemeris), time points when the GPS satellites transmit the electric waves, the strength of the reception signals, frequencies, and the like based on all of the received reception signals from the GPS satellites, and output them to the computer 18. The attitude angle sensor 16 is, for example, a geomagnetic sensor, and detects the geomagnetism.

The computer 18 includes a CPU, a ROM that stores a program for implementing a positioning process routine described later, a RAM that temporarily stores data, and a storage such as a HDD.

As shown in FIG. 1, the computer 18 includes, as functional blocks, a satellite information acquisition portion 30 that acquires the GPS satellite information of all GPS satellites that receive the electric waves from each of the receivers 14A and 14B, calculates GPS pseudo distance data, doppler frequencies, and position coordinates of the GPS satellites, and acquires them. In the drawings, the satellite information acquisition portion 30 may be referred to as "SATELLITE INFORMATION ACQ". The computer 18 includes an attitude angle calculation portion 32 that calculates the attitude angle of the subject vehicle based on the detection value of the attitude angle sensor 16. In the drawings, the attitude angle calculation portion 32 may be referred to as "ATTITUDE ANGLE CAL". The computer 18 includes a positional relationship calculation portion 34 that calculates, based on the calculated attitude angle of the subject vehicle, the positional relationship between the installation location of the GPS antenna on the earth and the positioning target location for each of the GPS antennas 12A and 12B. In the drawings, the positional relationship calculation portion 34 may be referred to as "POSITION RELATION CAL". The computer 18 includes a position calculation portion 36 that calculates a position of the positioning target location on the earth by using the calculated positional relationship and the acquired satellite information. In the drawings, the position calculation portion 36 may be referred to as "POSITION CAL".

The satellite information acquisition portion 30 acquires the GPS satellite information of all GPS satellites that have received the electric waves from the receivers 14A and 14B, and calculates GPS pseudo distance data based on the time point when the GPS satellite transmits the electric wave and the time point when the subject vehicle receives the electric waves. The satellite information acquisition portion 30 calculates the doppler frequency of the reception signal from each GPS satellite based on the known frequency of the signal transmitted from each GPS satellite and the frequency of the reception signal received from each GPS satellite. The doppler frequency is obtained by observing the amount of doppler shift of the carrier frequency due to the relative speed between the GPS satellite and the subject vehicle. The satellite information acquisition portion 30 calculates the position coordinate of the GPS satellite based on orbit information of the GPS satellite and the time point when the GPS satellite transmits the electric waves.

Figure 3A:
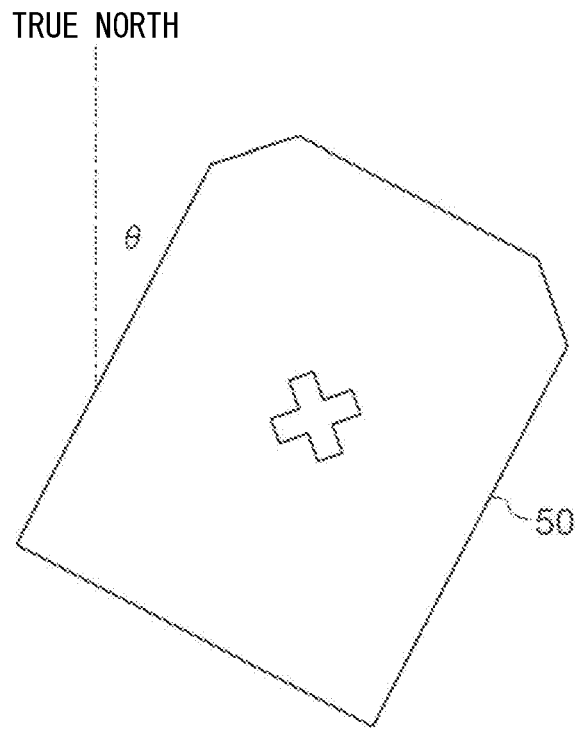
FIG. 3A is a view showing an example of a vehicle attitude angle calculation result at a certain time point.
Figure 3B:
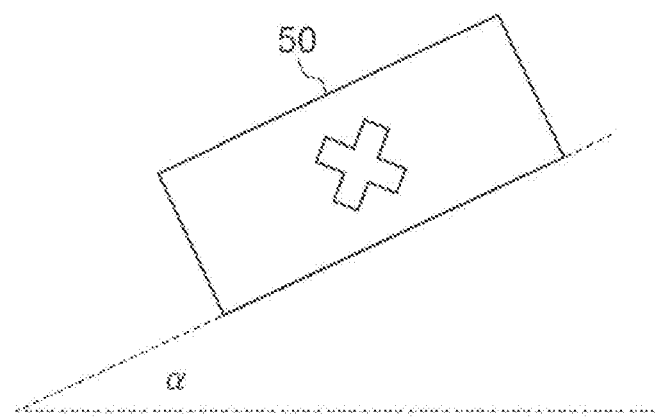
FIG. 3B is a view showing an example of the vehicle attitude angle calculation result at a certain time point.

The attitude angle calculation portion 32 calculates the attitude angle of the subject vehicle at the time point by using the detection value of the attitude angle sensor 16. The attitude angle calculation portion 32 and the attitude angle sensor 16 may correspond to an attitude detection portion. In the present embodiment, the case of calculating the attitude angle of the subject vehicle by using the geomagnetic sensor as the attitude angle sensor 16 is described. However, it is not limited to this. For example, the attitude angle of the subject vehicle may be calculated by using the vehicle speed vector calculated based on the doppler frequency or the vehicle acceleration and the vehicle angular speed detected from a 6-axis gyro sensor. Hereinafter, as shown in FIGS. 3A and 3B, it is assumed that the attitude angle of the subject vehicle 50 at the certain time point, that is, a yaw angle is equal to 0 (when the true north is set to 0 and the rotation angle is a clockwise direction), a pitch angle is equal to a, and a roll angle is equal to 0.

The positional relationship calculation portion 34 calculates a relationship of absolute positions on the earth between the positioning target location (vehicle center) and each antenna installation location based on each distance between the preliminarily obtained installation location of each of the GPS antennas 12A and 12B on the earth and the positioning target location, and the angle of the installation location of each of the GPS antennas 12A and 12B, and the detected attitude angle of the subject vehicle. Specifically, the relation is calculated by the following procedure. Here, a case of the GPS antenna 12A will be described.

Figure 4A:
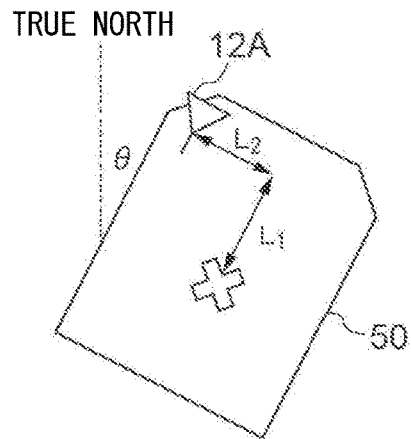
FIG. 4A is a view for illustrating a positional relationship calculation method of calculating a positional relationship between a positioning target location and an antenna installation location in an ENU coordinate system.
Figure 4B:
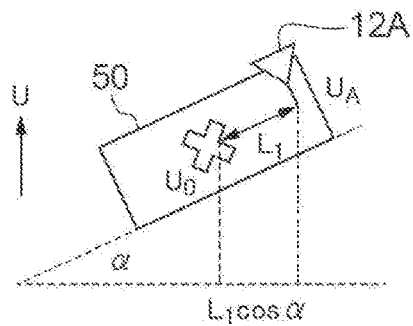
FIG. 4B is a diagram for illustrating the positional relationship calculation method of calculating the positional relationship between the positioning target location and the antenna installation location in the ENU coordinate system.
Figure 4C:
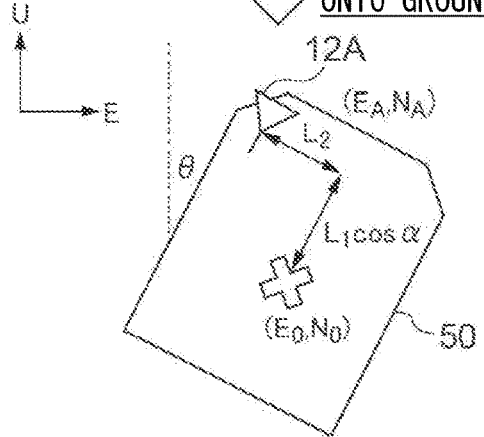
FIG. 4C is a view for illustrating the positional relationship calculation method of calculating the positional relationship between the positioning target location and the antenna installation location in the ENU coordinate system.

(First Procedure)
A positional relationship in an ENU (East-North-Up) coordinate system is calculated by a following first equation (see FIG. 4A, FIG. 4B, and FIG. 4C).

$E_A = E_0 + L_1 \cos\alpha \sin\theta - L_2 \cos\theta$ $N_A + N_0 + L_1 \cos\alpha \cos\theta + L_2 \sin\theta$ $U_A = U_0 + L_1 \sin\alpha$ [First Equation]

(Second Procedure)
The ENU coordinate system is converted into an ECEF (Earth-Centered Earth-Fixed) coordinate system by the following second equation, and thereby the relationship of the absolute position on the earth is calculated. Similarly, the positional relationship between the location where the GPS antenna 12B is installed and the positioning target location is calculated. Hereinafter, the calculation result of the positional relationship obtained in such a manner is described as "installation location of GPS antenna 12A=FA (positioning target location)".

$x_A = x_{base} + Fx(E_A, N_A, U_A)$ $y_A = y_{base} + Fy(E_A, N_A, U_A)$ $z_A = z_{base} + Fz(N_A, U_A)$ [Second equation]

Here, the following definition and the following equations are used. $(x_{base}, y_{base}, z_{base})$: reference point of ENU coordinate $$Fx(E_A, N_A, U_A) = -E_A * s_1 - N_A * c_1 * s_2 + U_A * c_1 * c_2$$

$$Fy(E_A, N_A, U_A) = -E_A * c_1 - N_A * s_1 * s_2 + U_A * s_1 * c_2$$

$$Fz(N_A, U_A) = N_A * c_2 + U_A * s_2$$

$$s_1 = \sin L$$

$$c_1 = \cos L$$

$$s_2 = \sin B$$

$$c_2 = \cos B$$

$$L = \tan^{-1} \frac{y_{base}}{x_{base}}$$

$$B = \tan^{-1} \frac{z + e'^2 b \sin(t)^3}{\sqrt{x_{base}^2 + y_{base}^2} - e^2 a \cos(t)^3}$$

$$b = a(1-f)$$

-continued $$e^2 = \frac{a^2 - b^2}{a^2}$$

$$e'^2 = \frac{a^2 - b^2}{b^2}$$

$$t = \tan^{-1}\left(\frac{z_{base}}{\sqrt{x_{base}^2 + y_{base}^2}} * \frac{a}{b}\right)$$

The "a" is the semimajor axis [m] of the earth, and the "f" is the flattening.

The position calculation portion 36 sets the position of the positioning target location and the time point error of each of the GPS antennas 12A and 12B to unknowns, and calculates the position of the positioning target location, based on the equation that describes the positions of the installation locations of the GPS antennas 12A and 12B with use of the position of the positioning target location and the absolute position relationship on the earth between the positioning target location (vehicle center) and each antenna installation location, and with use of the pseudo distance observed by the GPS antennas 12A and 12B at the installation location of each of the GPS antennas 12A and 12B.

Specifically, in a case where a three-dimensional position vector (x, y, z) of the ECEF coordinate system of the positioning target location and the time point error (hereinafter, referred to as a clock bias) of each of the two receivers 14A and 14B are set to unknowns. The total number of set unknowns is five. A three-dimensional position vector in the ECEF coordinate system of the installation location of each of the GPS antennas 12A and 12B are set to FA (x, y, z) and FB (x, y, z), similarly to the conventional positioning (positioning by one GPS antenna), a third equation is established for each of the GPS antennas 12A and 12B and each satellite (here, only GPS antenna 12A is described. The similar applies to the GPS antenna 12B). Thereby, the position (x, y, z) of the positioning target location is calculated using the observation results by a total of 5 or more satellites of GPS antennas 12A and 12B. When the number of installed GPS antennas is N, the position (x, y, z) of the positioning target location is calculated using observation results by a total of (n+3) or more satellites.

$$PR_i = \sqrt{(X_{si} - x_A)^2 + (Y_{si} - y_A)^2 + (Z_{si} - z_A)^2} + Cb_A \quad \text{[Third equation]}$$

Here, the position of the GPS antenna 12A is expressed by the following equation.

$$(x_A, y_A, z_A) = F_A(x, y, z)$$

The (x, y, z) is the position of the positioning target location. The $Cb_A$ is a clock bias [m] (the distance is obtained by multiplying the speed of light) of the receiver 14A of the GPS antenna 12A. The $PR_i$ is a pseudo distance [m] observed for the satellite. The $(X_{si}, Y_{si}, Z_{si})$ is a satellite position.

In such a manner, by appropriately considering the positional relationship between the positioning target location and the antenna installation location, it may be possible to calculate the position of the positioning target location with high accuracy even when using the pseudo distance observed at the position different from the positioning target location.

Next, operations of the positioning device 10 according to the first embodiment will be described.

Figure 5:
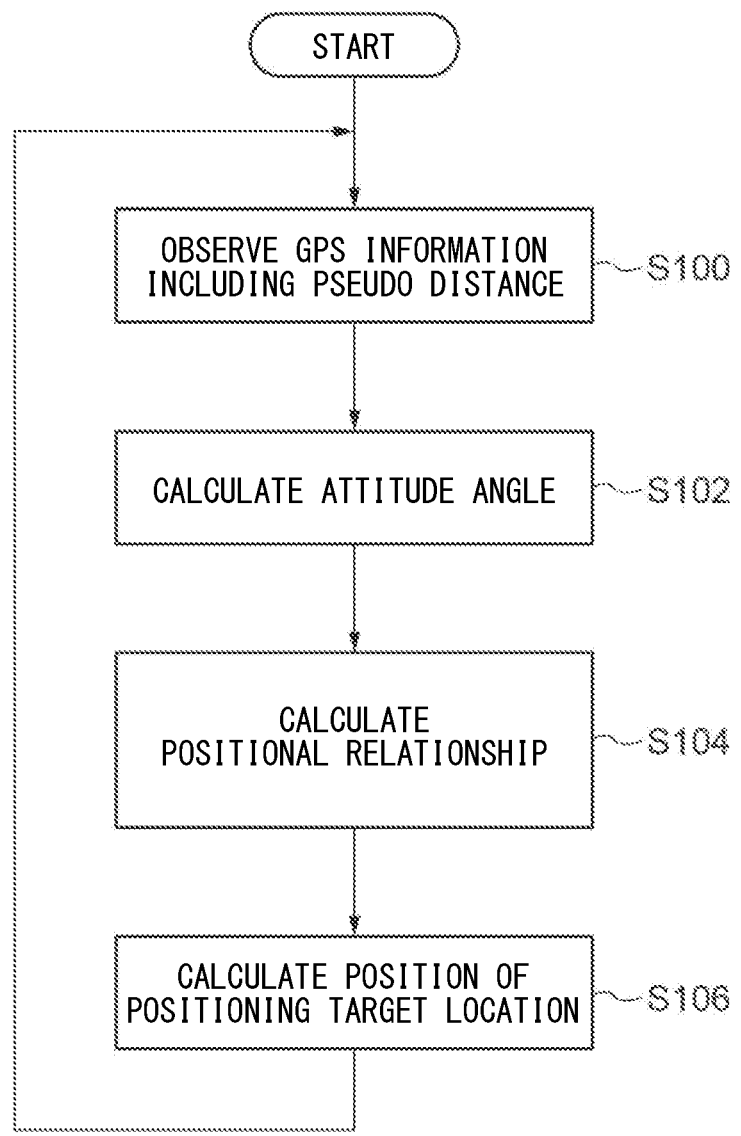
FIG. 5 is a flowchart showing contents of a positioning process routine by a computer of the positioning device according to the first embodiment.

When the attitude angle sensor 16 detects the geomagnetism and the GPS antennas 12A and 12B and the receivers 14A and 14B receive the electric waves from the multiple GPS satellites, the computer 18 repeats the positioning process routine shown in FIG. 5.

In S100, when information of the multiple GPS satellites is acquired from the GPS receivers 14A and 14B, the GPS pseudo distance data of the multiple GPS satellites, the doppler frequencies, and the position coordinates of the GPS satellites are calculated and acquired. The GPS information, which is acquired at the same time point, of the multiple GPS satellites is acquired as a GPS information group.

Next, in S102, the attitude angle of the subject vehicle is calculated based on the detection value from the attitude angle sensor 16.

Next, in S104, the positional relationship in the ECEF coordinate system between the positioning target location (vehicle center) and each antenna installation location is calculated based on each distance between the preliminarily obtained installation location of each of the GPS antennas 12A and 12B on the earth and the positioning target location, the angle of the installation location of each of the GPS antennas 12A and 12B, and the attitude angle of the detected subject vehicle.

In S106, the position of the positioning target location is calculated based on the equation and the pseudo distance observed by each of the GPS antennas 12A and 12B at the installation location of each of the GPS antennas 12A and 12B, and output by the output portion 20. In the equation, the position of the positioning target location and the time point error of each of the GPS antennas 12A and 12B are set to unknowns, and the positions of the installation locations of the GPS antennas 12A and 12B are described using the position of the positioning target location and the positional relationship in the ECEF coordinate system between the positioning target location (vehicle center) and each antenna installation location. The process shifts to S100.

As described above, the positioning device according to the first embodiment calculates, based on the detected attitude angle of the subject vehicle, the positional relationship between the installation location of the GPS antenna on the earth and the positioning target location for each of the multiple GPS antennas. The positioning device calculates the position of the positioning target location on the earth by using the calculated positional relationship and the acquired satellite information. Thereby, it may be possible to accurately calculate the position, on the earth, of the positioning target location different from the installation locations of the multiple GPS antennas of the vehicle.

Even when the positioning target location is not the center of gravity of the GPS antenna installation locations or when the positioning target location and each GPS antenna installation location are separated, it may be possible to calculate the position of the positioning target location and the speed with high accuracy.

Further, the number of satellites to be observed is smaller than that in a case of performing positioning calculation for each GPS antenna. Further, the degree of freedom for the installation location of the GPS antenna is improved since the positioning target location may not be the center of gravity of the installation locations of the GPS antennas.

Second Embodiment

Next, a send embodiment will be described. Regarding a positioning device of the second embodiment, the same configuration as that of the positioning device 10 of the first embodiment is designated by the same reference numerals, and the description thereof will be omitted.

The second embodiment is mainly different from the first embodiment in that, when the reliability of the calculated attitude angle is low, the installation locations of the multiple GPS antennas are assumed to be same as the positioning target location, and the position of the positioning target location in the ECEF coordinate system is calculated.

Figure 6:
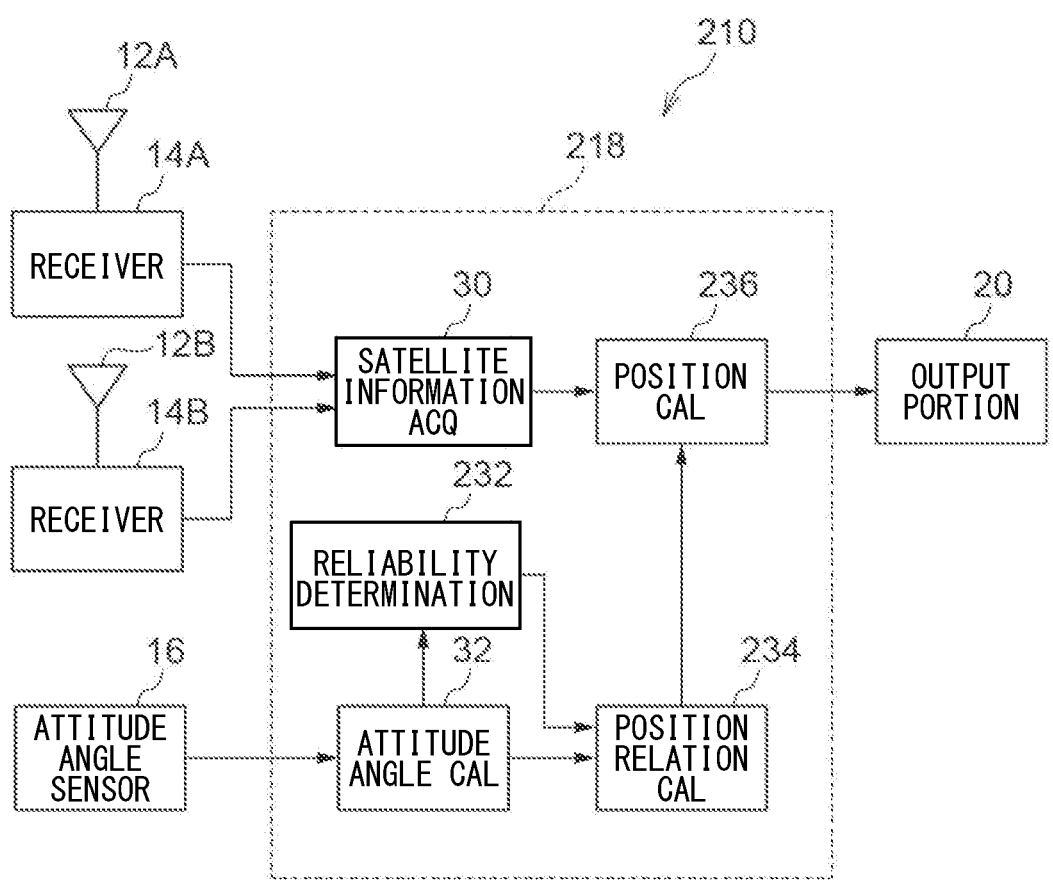
FIG. 6 is a block diagram showing a positioning device according to a second embodiment.

As shown in FIG. 6, a computer 218 of a positioning device 210 according to the second embodiment includes the satellite information acquisition portion 30, the attitude angle calculation portion 32, a reliability determination portion 232, a positional relationship calculation portion 234, and a position calculation portion 236. In the drawings, the reliability determination portion 232 may be referred to as "RELIABILITY DETERMINATION", the positional relationship calculation portion 234 may be referred to as "POSITION RELATION CAL", and the position calculation portion 236 may be referred to as "POSITION CAL".

The reliability determination portion 232 determines the reliability of the subject vehicle attitude angle calculated by the attitude angle calculation portion 32. Specifically, for determining the reliability of the attitude angle in accordance with the traveling distance or the fluctuation of the calculated attitude angle, for example, the reliability of the attitude angle may be determined to be lower as the traveling distance is shorter, or the reliability of the attitude angle may be determined to be lower as the fluctuation of the attitude angle is greater.

When the attitude angle reliability determined by the reliability determination portion 232 is equal to or higher than a threshold, similarly to the first embodiment described above, the positional relationship calculation portion 234 calculates a relationship of absolute positions on the earth between the positioning target location (vehicle center) and each antenna installation location based on each distance between the preliminarily obtained installation location of each of the GPS antennas 12A and 12B on the earth and the positioning target location, and the angle of the installation location of each of the GPS antennas 12A and 12B, and the detected attitude angle of the subject vehicle.

On the other hand, when the attitude angle reliability determined by the reliability determination portion 232 is less than the threshold, it is assumed that the installation locations of the GPS antennas 12A and 12B are same as the positioning target location.

The position calculation portion 236 calculates the position of the positioning target location by using the positional relationship calculated by the positional relationship calculation portion 234.

Specifically, when the attitude angle reliability determined by the reliability determination portion 232 is equal to or higher than the threshold, similarly to the first embodiment described above, the position of the positioning target location is calculated by using the positional relationship calculated by the positional relationship calculation portion 234. On the other hand, when the attitude angle reliability determined by the reliability determination portion 232 is less than the threshold, it is assumed that the installation locations of the GPS antennas 12A and 12B are same as the positioning target location, and the position of the positioning target location in the ECEF coordinate system is calculated. For example, based on the concept similar to that of Patent Literature 2 described above, the position of the positioning target location may be calculated.

Next, the operations of the positioning device 210 according to the second embodiment will be described. The similar process to that in the first embodiment are designated by the same reference numerals, and detailed description thereof will be omitted.

Figure 7:
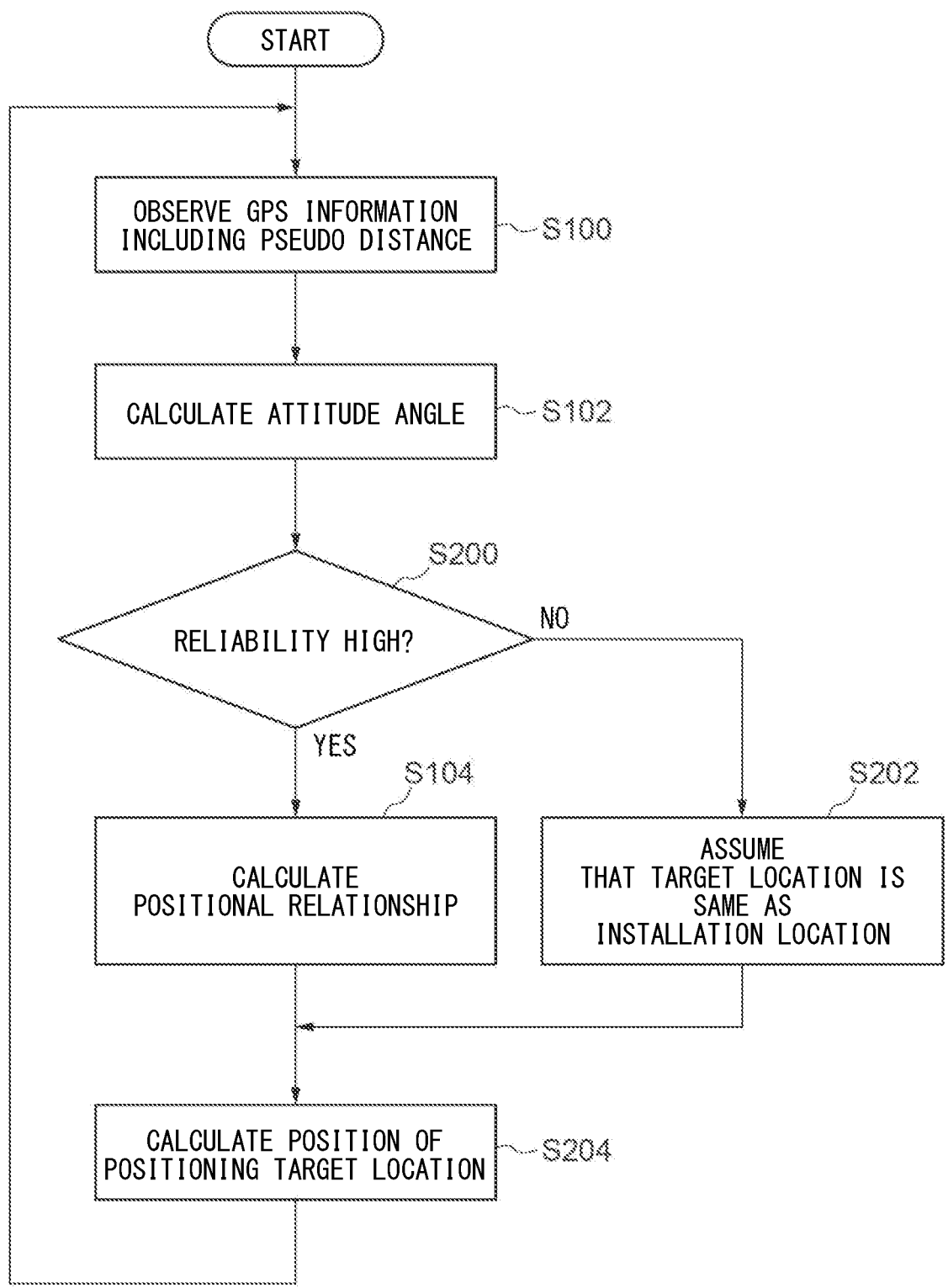
FIG. 7 is a flowchart showing contents of a positioning process routine by a computer of the positioning device according to the second embodiment.

When the attitude angle sensor 16 detects the geomagnetism and the GPS antennas 12A and 12B and the receivers 14A and 14B receive the electric waves from the multiple GPS satellites, the computer 218 repeats the positioning process routine shown in FIG. 7.

In S100, when information of the multiple GPS satellites is acquired from the GPS receivers 14A and 14B, the GPS pseudo distance data of the multiple GPS satellites, the doppler frequencies, and the position coordinates of the GPS satellites are calculated and acquired. The GPS information of the multiple GPS satellites is acquired, as a GPS information group, at the same time point.

Next, in S102, the attitude angle of the subject vehicle is calculated based on the detection value from the attitude angle sensor 16. In S200, it is determined whether the subject vehicle attitude angle reliability calculated in S102 described above is equal to or higher than the threshold.

When the reliability of the calculated attitude angle of the subject vehicle is equal to or higher than the threshold, the process shifts to S104, and the positional relationship in the ECEF coordinate system between the positioning target location (vehicle center) and each antenna installation location is calculated based on each distance between the preliminarily obtained installation location of each of the GPS antennas 12A and 12B on the earth and the positioning target location, and the angle of the installation location of each of the GPS antennas 12A and 12B, and the detected attitude angle of the subject vehicle.

On the other hand, when the reliability of the calculated attitude angle of the subject vehicle is less than the threshold, the process shifts to S202, and it is assumed that the installation locations of the GPS antennas 12A and 12B are same as the positioning target location.

In S204, the position of the positioning target location is calculated by using the installation locations of the GPS antennas 12A and 12B and the positioning target location that are obtained in S104 or S202 described above, and output by the output portion 20. The process shifts to S100.

As described above, the positioning device according to the second embodiment calculates the position of the positioning target location on the earth on the assumption that the installation locations of the GPS antennas are same as the positioning target location when the reliability of the detected subject vehicle attitude angle is low. Thereby, it may be possible to stably calculate the position, on the earth, of the positioning target location.

Third Embodiment

Figure 8:
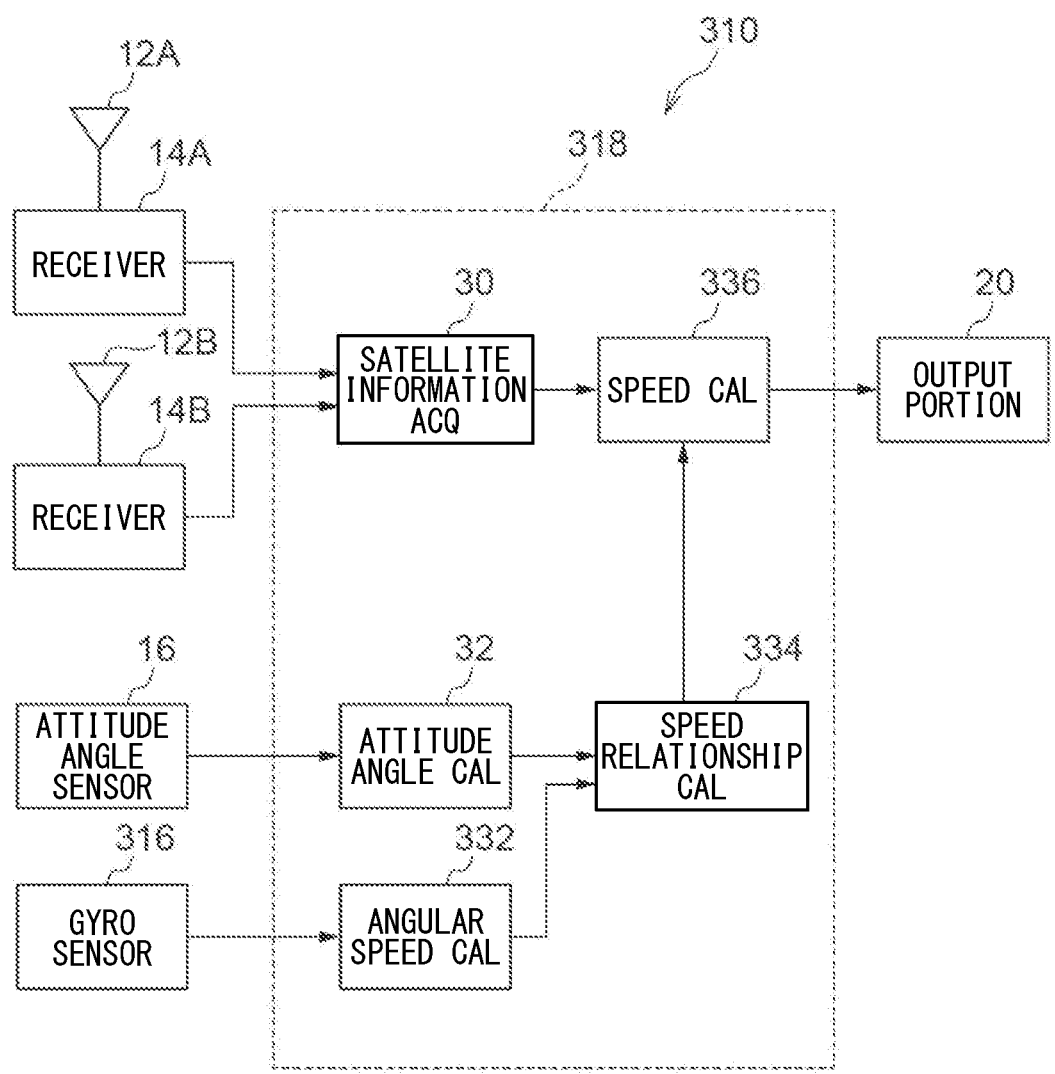
FIG. 8 is a block diagram showing a speed measuring device according to a third embodiment.

Next, a third embodiment will be described. In the third embodiment, a case where the present disclosure is applied to a speed measuring device that calculates the speed of the subject vehicle will be described. Regarding the speed measuring device in the third embodiment, the similar configuration to the positioning device 10 in the first embodiment is designated by the same reference numerals, and the description thereof will be omitted. As shown in FIG. 8, a speed measuring device 310 according to the third embodiment includes the multiple antennas 12A and 12B, the multiple receivers 14A and 14B, the attitude angle sensor 16, and a gyro sensor 316. The speed measuring device 310 includes the attitude angle sensor 16, a computer 318 that executes a speed estimation process of estimating the speed of the subject vehicle based on the reception signals received by the receivers 14A and 14B from the GPS satellites and the detection values of the attitude angle sensor 16, the gyro sensor 316, and the output portion 20.

As shown in FIG. 8, the computer 318 includes, as functional blocks, the satellite information acquisition portion 30, the attitude angle calculation portion 32, an angular speed calculation portion 332 that calculates the angular speed of the subject vehicle based on the detection value of the gyro sensor 316. The computer 318 includes a speed relationship calculation portion 334 that calculates the speed relationship between the installation location of the GPS antenna on the earth and the positioning target location for each of the GPS antennas 12A and 12B based on the calculated attitude angle and the calculated angular speed of the subject vehicle, and a speed calculation portion 336 that calculates the speed at the positioning target location on the earth by using the calculated speed relationship and the acquired satellite information. In the drawings, the angular speed calculation portion 332 may be referred to as "ANGULAR SPEED CAL", the speed relationship calculation portion 334 may be referred to as "SPEED RELATIONSHIP CAL", and the speed calculation portion 336 may be referred to as "SPEED CAL".

Figure 9A:
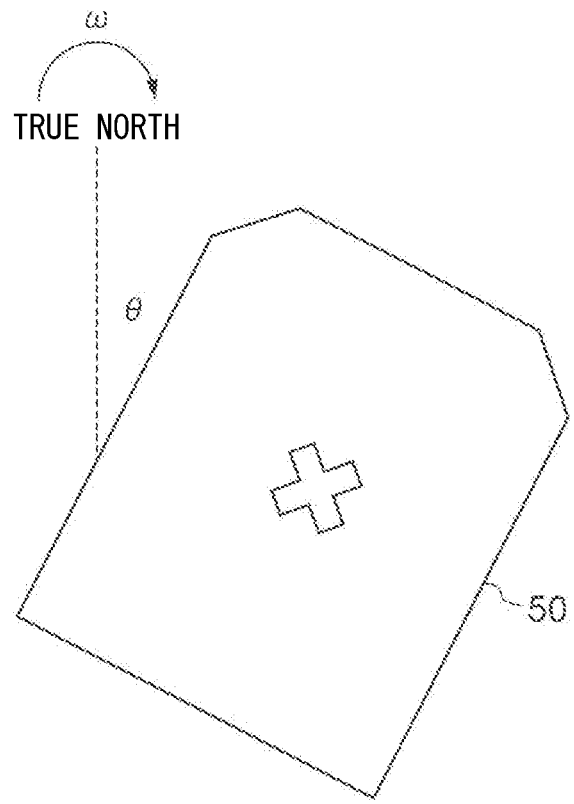
FIG. 9A is a view showing an example of a vehicle angular speed at a certain time point and an attitude angle calculation result.
Figure 9B:
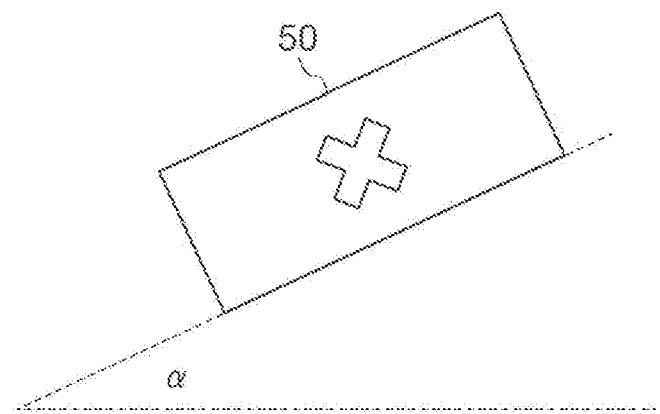
FIG. 9B is a view showing an example of a vehicle angular speed at a certain time point and an attitude angle calculation result.

The attitude angle calculation portion 32 calculates the attitude angle of the subject vehicle at the time point by using the detection value of the attitude angle sensor 16. The angular speed calculation portion 332 calculates the angular speed of the subject vehicle at the time point by using the detection value of the gyro sensor 316. Hereinafter, as shown in FIGS. 9A and 9B, it is assumed that the angular speed at the certain time point, that is, a yaw rate is equal to 0, a pitch rate is equal to 0, a roll rate is equal to 0, and the attitude angle, that is, a yaw angle is equal to 0 (when the true north is set to 0 and the rotation angle is a clockwise direction), a pitch angle is equal to a, and a roll angle is equal to 0.

The speed relationship calculation portion 334 calculates a speed relationship on the earth between the positioning target location (vehicle center) and each antenna installation location based on each distance between the preliminarily obtained installation location of each of the GPS antennas 12A and 12B on the earth and the positioning target location, the angle of the installation location of each of the GPS antennas 12A and 12B, the detected attitude angle of the subject vehicle, and the angular speed. Specifically, the speed relationship is calculated by the following procedure. Here, a case of the GPS antenna 12A will be described.

First Procedure

Figure 10A:
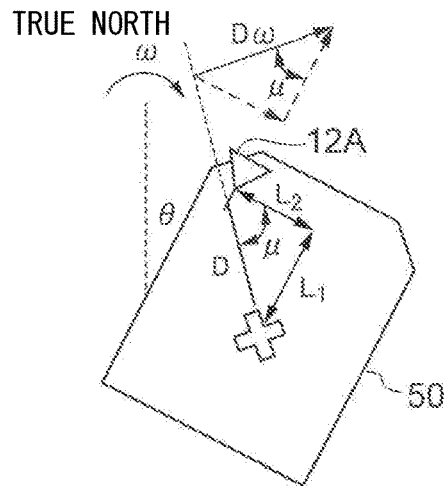
FIG. 10A is a diagram for illustrating a speed relationship calculation method between the positioning target location and the antenna installation location in the ENU coordinate system.
Figure 10B:
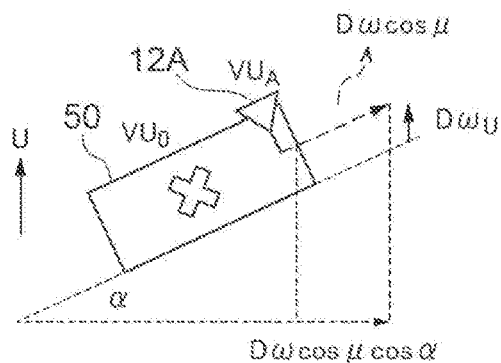
FIG. 10B is a diagram for illustrating the speed relationship calculation method between the positioning target location and the antenna installation location in the ENU coordinate system.
Figure 10C:
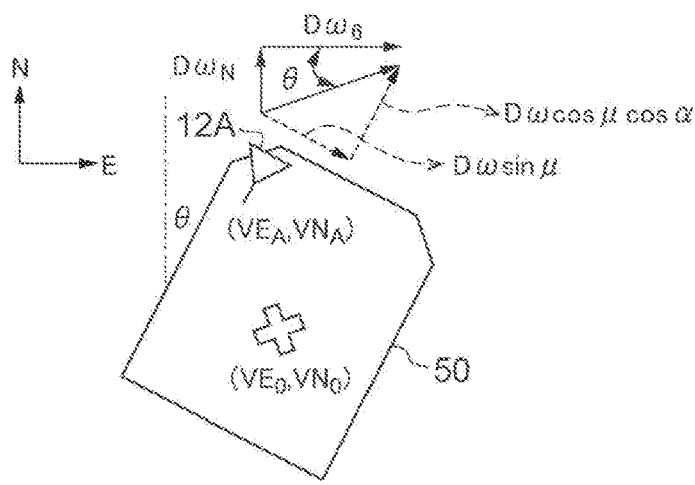
FIG. 10C is a diagram for illustrating the speed relationship calculation method between the positioning target location and the antenna installation location in the ENU coordinate system.

By the following fourth equation, the speed relationship in the ENU (East-North-Up) coordinate system is calculated (see FIG. 10A, 10B, and FIG. 10C).

$VE_A = VE_0 + D\omega_E$ $VN_A = VN_0 + D\omega_N$ $VU_A = VU_0 + D\omega_U$ [Fourth equation]

Here, the following equations are used.

$D\omega_E = D\omega \sin \mu \cos \theta + D\omega \cos \mu \cos \alpha \sin \theta$ $D\omega_N = D\omega \cos \mu \cos \alpha \cos \theta - D\omega \sin \mu \sin \theta$ $D\omega_U = D\omega \cos \mu \sin \alpha$ $\cos \mu = L_2/D$ $\sin \mu = L_1/D$ Second Procedure The ENU coordinate system is converted into the ECEF (Earth-Centered Earth-Fixed) coordinate system by the following fifth equation, and thereby the speed relationship on the earth is calculated. Similarly, the speed relationship between the installation location of the GPS antenna 12B and the positioning target location will be described. Hereinafter, the calculation result of the speed relationship obtained in such a manner is described as "speed at installation location of GPS antenna 12A=GA (speed at positioning target location)".

$Vx_A = Gx(VE_A, VN_A, VU_A)$ $Vy_A = Gy(VE_A, VN_A, VU_A)$ $Vz_A = Gz(VN_A, VU_A)$ (Fifth equation)

Here, the following definition and the following equations are used. $(x_{base}, y_{base}, z_{base})$: reference point of ENU coordinate $Gx(VE_A, VN_A, VU_A) = -VE_A * s_1 - VN_A * c_1 * s_2 + VU_A * c_1 * c_2$ $Gy(VE_A, VN_A, VU_A) = -VE_A * c_1 - VN_A * s_1 * s_2 + VU_A * s_1 * c_2$ $Gz(VN_A, VU_A) = VN_A * c_2 + VU_A * s_2$ $s_1 = \sin L$ $c_1 = \cos L$ $s_2 = \sin B$ $c_2 = \cos B$ $L = \tan^{-1} \frac{y_{base}}{x_{base}}$ $B = \tan^{-1} \frac{z + e'^2 b \sin(t)^3}{\sqrt{x_{base}^2 + y_{base}^2} - e^2 a \cos(t)^3}$ $b = a(1 - f)$ $e^2 = \frac{a^2 - b^2}{a^2}$ $e'^2 = \frac{a^2 - b^2}{b^2}$ $t = \tan^{-1} \left( \frac{z_{base}}{\sqrt{x_{base}^2 + y_{base}^2}} * \frac{a}{b} \right)$ The "a" is the semimajor axis [m] of the earth, and the "f" is the flattening. The speed calculation portion 336 calculates the speed at the positioning target location based on an equation and a relative speed with the satellite. In the equation, the speed at the positioning target location and the time point errors of the GPS antennas 12A and 12B are set to unknowns, and the speeds of the installation locations of the GPS antennas 12A and 12B are described by using the speed at the positioning target location and the speed relationship on the earth between the positioning target location (vehicle center) and each antenna installation location. The relative speed is obtained from the doppler frequency observed by each of the GPS antennas 12A and 12B at the installation location of each of the GPS antennas 12A and 12B.

Specifically, a three-dimensional speed vector (Vx, Vy, Vz) in the ECEF coordinate system of the positioning target location and the change quantity (hereinafter, referred to as clock drift) of the clock bias of the receivers 14A and 14B are set to unknowns (that is, the number of unknowns is five). The three-dimensional speed vectors in the ECEF coordinate system of the installation locations of the GPS antennas 12A and 12B are set to GA(Vx, Vy, Vz) and GB(Vx, Vy, Vz). Similarly to Non-Patent Literature 1 described above (speed calculation by one GPS antenna), a sixth equation is established for each of the GPS antennas 12A and 12B and for each satellite (here, only GPS antenna 12A is described. The similar applies to the GPS antenna 12B). Thereby, the speed (Vx, Vy, Vz) at the positioning target location is calculated by using observation results of a total of five or more satellites of the GPS antennas 12A and 12B. When the number of installed GPS antennas is N, the speed (Vx, Vy, Vz) at the positioning target location is calculated by using the observation results of a total of (N+3) or more satellites.

$$\frac{\partial PR_i}{\partial t} = \frac{(X_{si} - x_A)(V_{xsi} - Vx_A)}{r_i} + \frac{(Y_{si} - y_A)(V_{ysi} - Vy_A)}{r_i} + \frac{(Z_{si} - z_A)(V_{zsi} - Vz_A)}{r_i} = -D_i \frac{C}{f_1}$$ [Sixth equation]

Here, the speed of the GPS antenna 12 is expressed by the following equation.

$$(VX_A, Vy_A, VZ_A) = G_A(Vx, Vy, Vz)$$

The (Vx, Vy, Vz) is the speed at the positioning target location. The $Cbv_A$ is a clock drift [m/s] (the speed is obtained by multiplying the speed of light) of the receiver 14A of the GPS antenna 12A. The $(x_A, y_A, z_A)$ is the position of the GPS antenna 12A. The Di is a doppler frequency [Hz] observed for the satellite. The $(X_{si}, Y_{si}, Z_{si})$ is the satellite position. The n is expressed by the following equation.

$$r_i = \sqrt{(X_{si}-x)^2 + (Y_{si}-y)^2 + (Z_{si}-z)^2}$$

The f1 is a carrier frequency (1575.42×106) [Hz]. The C is the speed of light (2.99792458×10$^8$) [m/s]. The ($V_{xsi}$, $V_{ysi}$, $V_{zsi}$) is the satellite speed.

In such a manner, by appropriately considering the speed relationship between the positioning target location and the antenna installation location, it may be possible to calculate the speed at the positioning target location with high accuracy even when using the doppler frequency observed at the position different from the positioning target location.

Next, the operations of the speed measuring device 310 according to the third embodiment will be described.

Figure 11:
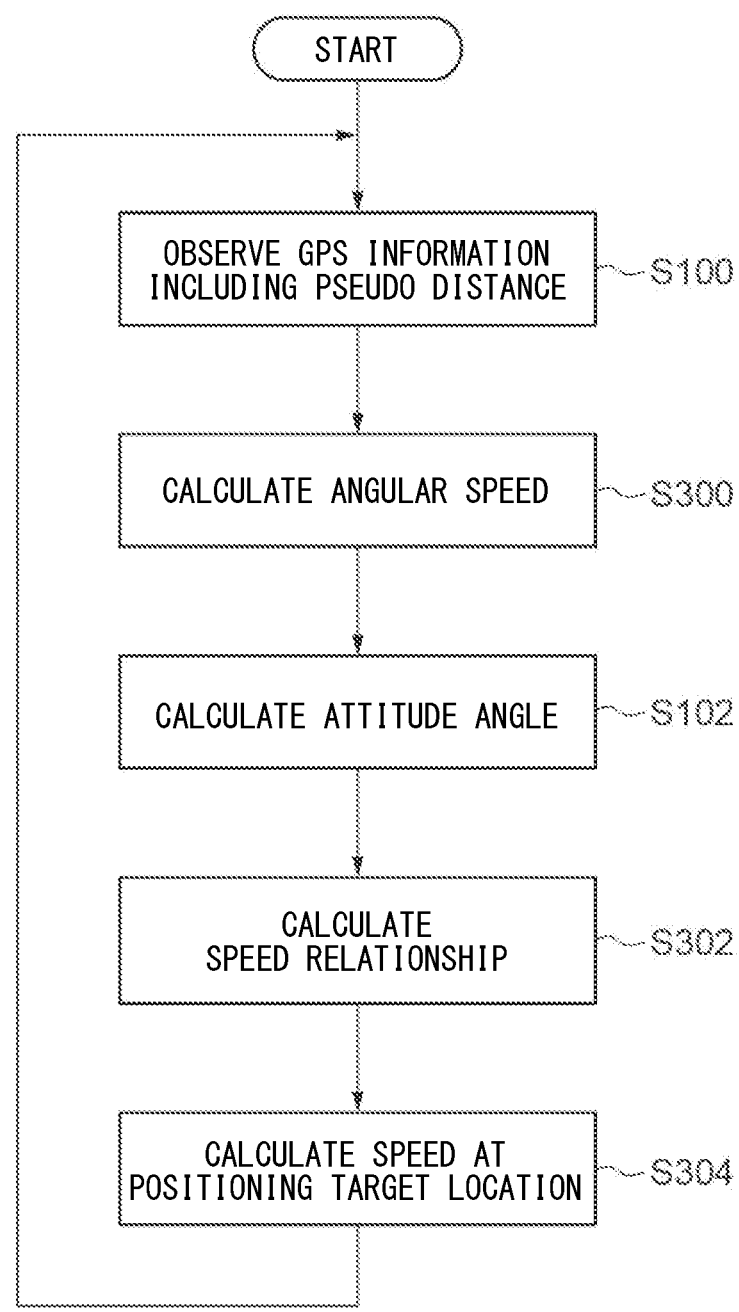
FIG. 11 is a flowchart showing contents of a speed measurement process routine by a computer of a speed measuring device according to the third embodiment.

The attitude angle sensor 16 detects the geomagnetism, the gyro sensor 316 detects the angular acceleration, and the GPS antennas 12A and 12B and the receivers 14A and 14B receive the electric waves from the multiple GPS satellites. Then, the computer 318 repeatedly executes a speed measurement process routine shown in FIG. 11.

In S100, when information of the multiple GPS satellites is acquired from the GPS receivers 14A and 14B, the GPS pseudo distance data of the multiple GPS satellites, the doppler frequencies, and the position coordinates of the GPS satellites are calculated and acquired. The GPS information of the multiple GPS satellites is acquired, as a GPS information group, at the same time point.

Next, in S300, the angular speed of the subject vehicle is calculated based on the detection value of the gyro sensor 316. In S102, the attitude angle of the subject vehicle is calculated based on the detection value from the attitude angle sensor 16.

Next, in S302, a speed relationship on the earth between the positioning target location (vehicle center) and each antenna installation location is calculated based on each distance between the preliminarily calculated installation location of each of the GPS antennas 12A and 12B on the earth and the positioning target location, the angle of the installation location of each of the GPS antennas 12A and 12B, the detected attitude angle of the subject vehicle, and the angular speed.

In S304, the speed at the positioning target location is calculated based on an equation and a relative speed with the satellite. In the equation, the speed at the positioning target location and the time point errors of the GPS antennas 12A and 12B are set to unknowns, and the speeds of the locations of the GPS antennas 12A and 12B are described by using the speed at the positioning target location and the speed relationship on the earth between the positioning target location (vehicle center) and each antenna installation location. The relative speed is obtained from the doppler frequency observed by each of the GPS antennas 12A and 12B at the installation location of each of the GPS antennas 12A and 12B. The speed is output by the output portion 20. The process returns to S100.

As described above, the speed measuring device according to the third embodiment calculates, based on the detected attitude of the subject vehicle and the detected angular speed, the speed relationship between the installation location of the GPS antenna on the earth and the positioning target location for each of the multiple GPS antennas. The speed measuring device calculates the speed at the positioning target location on the earth by using the calculated speed relationship and the acquired satellite information. Thereby, it may be possible to accurately calculate the speed, on the earth, of the positioning target location different from the installation locations of the multiple GPS antennas of the vehicle.

Fourth Embodiment

Next, a fourth embodiment will be described. Regarding the speed measuring device in the fourth embodiment, the similar configurations to that of the speed measuring device 310 in the third embodiment will be designated by the same reference numerals, and the description thereof will be omitted.

The fourth embodiment is mainly different from the third embodiment in that the speed at the positioning target location in the ECEF coordinate system is calculated on the assumption that the speeds at the installation locations of the multiple GPS antennas and the speed at the positioning target location are same when the reliabilities of the calculated attitude angle and the calculated angular speed are low.

Figure 12:
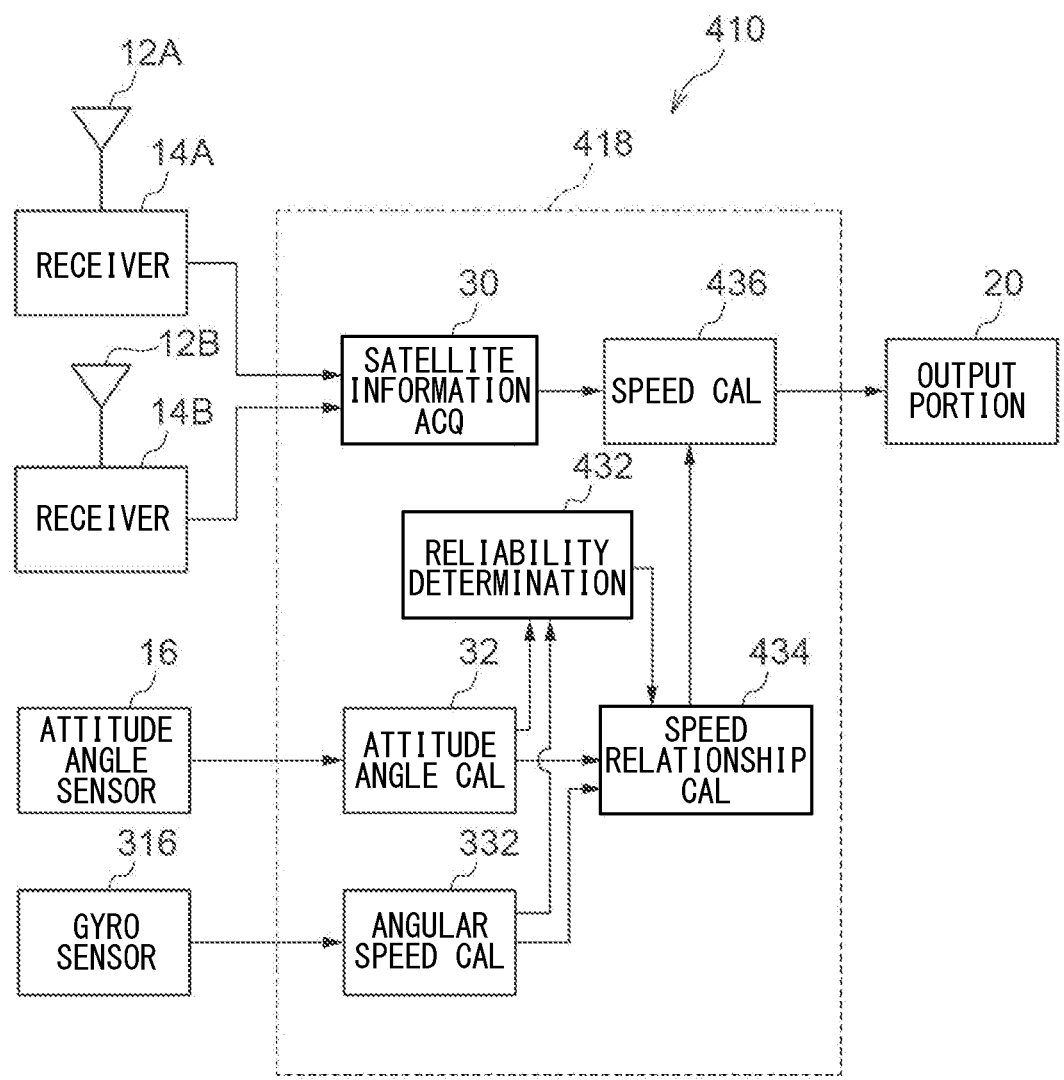
FIG. 12 is a block diagram showing a speed measuring device according to a fourth embodiment.

As shown in FIG. 12, a computer 418 of a speed measuring device 410 according to the fourth embodiment includes the satellite information acquisition portion 30, the attitude angle calculation portion 32, the angular speed calculation portion 332, a reliability determination portion 432, a speed relationship calculation portion 434, and a speed calculation portion 436. In the drawings, the reliability determination portion 432 may be referred to as "RELIABILITY DETERMINATION", the speed relationship calculation portion 434 may be referred to as "SPEED RELATIONSHIP CAL", and the speed calculation portion 436 may be referred to as "SPEED CAL".

The reliability determination portion 432 determines the reliabilities of the subject vehicle attitude angle calculated by the attitude angle calculation portion 32 and the subject vehicle angular speed calculated by the angular speed calculation portion 332. Specifically, the reliabilities of the attitude angle and the angular speed may be determined in accordance with the traveling distance, the fluctuation of the calculated attitude angle, and the fluctuation of the angular speed. For example, the reliabilities of the attitude angle and the angular speed are determined to be lower as the traveling distance is shorter, or the reliabilities of the attitude angle and the angular speed may be determined to be lower as the fluctuation of the attitude angle and the fluctuation of the angular speed are larger.

When the attitude angle reliability and the angular speed reliability determined by the reliability determination portion 432 are equal to or higher than the threshold, similarly to the third embodiment described above, the speed relationship calculation portion 434 calculates a speed relationship on the earth between the positioning target location (vehicle center) and each antenna installation location based on each distance between the preliminarily obtained installation location of each of the GPS antennas 12A and 12B on the earth and the positioning target location, the angle of the installation location of each of the GPS antennas 12A and 12B, the detected attitude angle of the subject vehicle, and the detected angular speed.

On the other hand, when the attitude angle reliability and the angular speed reliability that are determined by the reliability determination portion 432 are less than the threshold, it is assumed that the speeds at the installation locations of the GPS antennas 12A and 12B are same as the speed at the positioning target location.

The speed calculation portion 436 calculates the speed at the positioning target location by using the speed relationship calculated by the speed relationship calculation portion 434.

Specifically, when the attitude angle reliability and the angular speed reliability that are determined by the reliability determination portion 432 are equal to or higher than the threshold, similarly to the first embodiment described above, the speed at the positioning target location is calculated by using the speed relationship calculated by the speed relationship calculation portion 434.

On the other hand, when the attitude angle reliability and the angular speed reliability that are determined by the reliability determination portion 432 are less than the threshold, it is assumed that the speeds at the installation locations of the GPS antennas 12A and 12B are assumed to be same as the speed at the positioning target location, and the speed at the positioning target location in the ECEF coordinate system is calculated. For example, the speed at the positioning target location may be calculated based on the similar concept to that of Non-Patent Literature 1 described above.

Since the other configurations and operations of the speed measuring device 410 according to the fourth embodiment are the similar to those of the second embodiment and the third embodiment, the description thereof will be omitted.

As described above, the speed measuring device according to the fourth embodiment calculates the speed at the positioning target location on the earth on the assumption that the speed at the installation locations of the GPS antennas are same as the speed at the positioning target location when the reliabilities of the detected subject vehicle attitude angle and the detected subject vehicle angular speed are low. Thereby, it may be possible to stably calculate the speed, on the earth, at the positioning target location.

In the embodiments described above, the example in which the present disclosure is applied to the positioning device or the speed measuring device mounted on the vehicle has been described. However, the mobile body on which the positioning device or the speed measuring device of the present disclosure is installed is not limited to the vehicle. For example, the positioning device or the speed measuring device may be mounted on a robot.

Further, the example in which the GPS is used as the satellite navigation system has been described. However, a different satellite positioning system (GLONASS, BeiDou, Galileo, QZSS) may be used or both of the GPS and the different satellite positioning system may be used.

The program may be stored, as instructions being executed by a computer or a processor, in a tangible non-transitory computer-readable medium. Here, the process of the flowchart or the flowchart described in this application includes a plurality of sections (or steps), and each section is expressed as, for example, S100. Further, each section may be divided into several subsections, while several sections may be combined into one section. Furthermore, each section thus configured may be referred to as a device, module, or means. The present disclosure has been described in accordance with the embodiments. However, it is to be understood that the present disclosure is not limited to the embodiment and structure. The present disclosure includes various modifications and modifications within the equivalent range. In addition, various combinations and configurations, as well as other combinations and configurations that include only one element, more, or less, are within the scope and spirit of the present disclosure.

The invention claimed is:

1. A positioning device configured to calculate a position, on an earth, of a positioning target location different from an installation location of each of a plurality of satellite antennas in a mobile body, the positioning device comprising:
   a satellite information acquisition portion configured to acquire satellite information including
      information that is related to a position of each of a plurality of satellites and transmitted from the plurality of satellites and
      information that is related to a distance between each of the plurality of satellites and the mobile body;
   an attitude detection portion configured to detect an attitude of the mobile body;
   a positional relationship calculation portion configured to calculate a positional relationship between the installation location of each of the plurality of satellite antennas on the earth and the positioning target location for each of the plurality of satellite antennas, based on a detected attitude of the mobile body;
   a position calculation portion configured to calculate the position of the positioning target location on the earth based on a calculated positional relationship and acquired satellite information; and
   a reliability determination portion configured to determine a reliability of the attitude detected by the attitude detection portion,
   wherein:
   the position calculation portion is configured to calculate the position of the positioning target location on the earth on assumption that the installation location of each of the plurality of satellite antennas is same as the positioning target location when the reliability determination portion determines that the reliability of the attitude is low.

2. The positioning device according to claim 1, wherein:
   the positional relationship calculation portion is configured to calculate the positional relationship based on a preliminarily obtained distance between the installation location of each of the plurality of satellite antennas on the earth and the positioning target location,
an angle of the installation location of each of the plurality of satellite antennas, and
the detected attitude of the mobile body.

3. The positioning device according to claim 1, wherein:
the position calculation portion is configured to calculate the position of the positioning target location based on an equation and a pseudo distance observed at the installation location of each of the plurality of satellite antennas;
in the equation, the position of the positioning target location and a time point error of each of the plurality of satellite antennas are set to unknowns; and
the equation describes the position of the installation location of each of the plurality of satellite antennas by the position of the positioning target location and the positional relationship.

4. A speed measuring device configured to calculate a speed, on an earth, at a positioning target location different from an installation location of each of a plurality of satellite antennas in a mobile body, the speed measuring device comprising:
a satellite information acquisition portion configured to acquire satellite information including
information that is related to a position of each of a plurality of satellites and transmitted from the plurality of satellites and
information that is related to a relative speed of the mobile body with respect to each of the plurality of satellites;
an attitude detection portion configured to detect an attitude of the mobile body;
an angular speed detection portion configured to detect an angular speed of the mobile body;
a positional relationship calculation portion configured to calculate a speed relationship between the installation location of each of the plurality of satellite antennas on the earth and the positioning target location for each of the plurality of satellite antennas, based on a detected attitude of the mobile body and a detected angular speed of the mobile body;
a speed calculation portion configured to calculate the speed at the positioning target location on the earth based on a calculated speed relationship and acquired satellite information; and
a reliability determination portion configured to determine a reliability of the detected attitude of the mobile body and a reliability of the detected angular speed of the mobile body,
wherein:
the speed calculation portion is configured to calculate the speed at the positioning target location on the earth on assumption that a speed at the installation location of each of the plurality of satellite antennas in the mobile body is same as the speed at the positioning target location when the reliability determination portion determines that the reliability of the detected attitude or the reliability of the detected angular speed is low.

5. The speed measuring device according to claim 4 wherein:
the speed relationship calculation portion is configured to calculate the speed relationship based on
a preliminarily obtained distance between the installation location of each of the plurality of satellite antennas on the earth and the positioning target location,
an angle of the installation location of each of the plurality of satellite antennas,
the detected attitude of the mobile body, and
the detected angular speed of the mobile body.

6. The speed measuring device according to claim 4, wherein:
the speed calculation portion is configured to calculate the speed at the positioning target location based on an equation and a relative speed with the satellite;
in the equation, the speed at the positioning target location and a change quantity of a time point error of each of the plurality of satellite antennas are set to unknowns;
the equation describes a speed at the installation location of each of the plurality of satellite antennas by the speed at the positioning target location and the speed relationship; and
the relative speed is obtained based on a doppler frequency observed at the installation location of each of the plurality of satellite antennas.

7. A computer program product that is used for calculating a position, on an earth, of a positioning target location different from an installation location of each of a plurality of satellite antennas in a mobile body, is stored on a non-transitory computer readable medium, and comprises instructions configured to, when executed by a computer, cause the computer to:
acquire satellite information including
information that is related to a position of each of a plurality of satellites and transmitted from the plurality of satellites and
information that is related to a distance between each of the plurality of satellites and the mobile body;
detect an attitude of the mobile body;
calculate a positional relationship between the installation location of each of the plurality of satellite antennas on the earth and the positioning target location for each of the plurality of satellite antennas, based on a detected attitude of the mobile body;
calculate a position of the positioning target location on the earth based on a calculated positional relationship and acquired satellite information; and
determine a reliability of the detected attitude,
wherein:
the position of the positioning target location on the earth is calculated on assumption that the installation location of each of the plurality of satellite antennas is same as the positioning target location when the reliability of the detected attitude is determined to be low.

8. A computer program product that is used for calculating a speed, on an earth, at a positioning target location different from an installation location of each of a plurality of satellite antennas in a mobile body, is stored on a non-transitory computer readable medium, and comprises instructions configured to, when executed by a computer, cause the computer to:
acquire satellite information including
information that is related to a position of each of a plurality of satellites and transmitted from the plurality of satellites and
information that is related to a relative speed of the mobile body with respect to each of the plurality of satellites;

detect an attitude of the mobile body;
detect an angular speed of the mobile body;
calculate a speed relationship between the installation location of each of the plurality of satellite antennas on the earth and the positioning target location for each of the plurality of satellite antennas, based on a detected attitude of the mobile body and a detected angular speed of the mobile body;
calculate the speed at the positioning target location on the earth based on a calculated speed relationship and acquired satellite information; and
determine a reliability of the detected attitude of the mobile body and a reliability of the detected angular speed of the mobile body,
wherein:
the speed at the positioning target location on the earth is calculated on assumption that a speed at the installation location of each of the plurality of satellite antennas in the mobile body is same as the speed at the positioning target location when the reliability of the detected attitude or the reliability of the detected angular speed is determined to be low.

\* \* \* \* \*